3,677,985
PRESSURE SENSITIVE ADHESIVE
COMPOSITIONS
Julius Sirota, South Plainfield, David J. Bentley, Jr., Westfield, and Benjamin D. Jubilee, Jr., Millington, N.J., assignors to National Starch and Chemical Corporation, New York, N.Y.
No Drawing. Filed Oct. 6, 1970, Ser. No. 78,558
Int. Cl. C08d 9/12
U.S. Cl. 260—27 R                    5 Claims

ABSTRACT OF THE DISCLOSURE

Pressure sensitive adhesives characterized by their excellent properties of tack, peel adhesion, and cohesive strength, and the substrates coated therewith are described.

---

This invention relates to the preparation of improved pressure sensitive adhesives which exhibit the properties of high tack, high peel adhesion, and high cohesive strength, and are particularly suited for use in manufacturing pressure sensitive tapes, labels, decals, wall coverings, and the like.

As is known in the art, pressure sensitive adhesives comprise a class of adhesive compositions which may be formulated from a variety of materials such as gums and resins of both natural and synthetic derivation. When coated on a suitable substrate, these adhesive compositions share the common characteristic of being aggressively and permanently tacky at room temperature and are thus able to adhere to surfaces by the application of nothing more than manual pressure. Adhesives of this type may be applied to various substrates such as paper, cloth and plastic films, and the resulting coated substrates may then be converted into tapes and labels which are especially useful in the packaging field for any number of applications involving markings, sealing, reinforcing or banding, as well as wall coverings, and the like.

In order to be satisfactory in commercial usage, a pressure sensitive adhesive must, of course, possess good tack and tack retention properties; i.e. the adhesive must wet out on the substrate, firmly adhere to a variety of surfaces and the adhesive films thereof should be stable on aging. Another important property of a pressure sensitive adhesive is that the adhesive possesses high interfacial strength as exhibited by a high peel adhesion value. An equally important property in many applications is that the adhesive exhibits high cohesive (or internal) strength which may be described as "hold" or "creep resistance." This property is necessary in order to insure minimum creep in applications where a heavy load is imposed on the adhesive, or for applications where minimum edge bleed is required as, for example, with tightly wound tape. Furthermore, high cohesive strength is a necessary characteristic of any adhesive composition which is to be employed in preparing adhesive products which must support considerable amounts of weight. It is also necessary that the property of high internal strength be instilled in a pressure sensitive adhesive without adversely affecting its tack and tack retention properties. Previously, internal strength had been imparted to pressure sensitive adhesives by such means as incorporating high molecular weight polymers in the adhesive formulation. Such high molecular weight polymers may be prepared either by polymerizing the polymers to a high degree during their manufacture, or by crosslinking or coupling low molecular weight polymers by means of heat or an additive or any combination thereof. The resultant adhesive which incorporated these high molecular weight polymers, however, exhibited high cohesive strength with low tack and peel adhesion. Heretofore, this problem was remedied to some extent by utilizing a low molecular weight polymer in the formulation or by the addition of low molecular weight resins called tackifying resins. The resultant adhesive in this instance would be a soft tacky product with high tack and peel adhesion but exhibiting creep and low cohesive strength. Thus, it can be seen that, previously, high cohesive strength was attainable only at the expense of accepting low tack and peel adhesion properties.

It is the object of this invention to prepare pressure sensitive adhesive compositions which display a combination of high tack, high peel adhesion, and high cohesive strength, and which are further characterized by their ready adhesion to a wide variety of substrates. Another object of this invention is the use of said adhesives to prepare pressure sensitive tapes, labels, decals, wall coverings, and the like. Other objects and advantages of this invention will be apparent from the following description.

In accordance with our invention pressure sensitive adhesives combining all of the desirable properties outlined above are prepared by blending together a suitable pressure sensitive copolymer containing reactive sites which serves as the base material for the adhesive, a tackifying resin which also contains reactive sites, and a coupling agent. Based on our experimental data, it is believed that the reactive sites of the copolymer are reacted with the coupling agent to form a bonded network which provides the internal strength necessary for high cohesive strength and creep resistance. Moreover, the tackifying resin by means of its reactive sites is also coupled into the copolymer network and thereby functions as an internal tackifier in preventing or inhibiting the copolymer from becoming excessively rigid and hard. Additional tackifiers which are devoid of reactive sites may also be added, if desired. Essentially, our novel formulations change the plastic character of prior art pressure sensitive adhesives into a more elastic and rubber-like character.

The copolymers which are suitable for use in preparing the pressure sensitive adhesives of the present invention contain moieties derived from at least one polymerizable monomer having reactive sites which serve to provide the reactive sites of the final copolymer. The term "reactive site" as used herein means a functional group such, for example, as a carboxyl or hydroxyl group. Illustrative of such monomers are: acrylic acid, methacrylic acid, crotonic acid, itaconic acid, N - methylolacrylamide, N-methylolmethacrylamide, fumaric and maleic acids (ordinarily derived from their anhydrides), and the $C_1$–$C_4$ alkyl half esters of fumaric and maleic acids, etc. Other copolymerizing comonomers are selected from one or more of the following classes of monomers: alkyl and hydroxyalkyl esters of acrylic and methacrylic acids containing a maximum number of about 12 carbon atoms in the alkyl group, such as ethyl acrylate, butyl acrylate, 2-ethylhexyl acrylate, octyl acrylate, hydroxypropyl acrylate, and ethyl methacrylate; nitriles of acrylic and methacrylic acids, such as acrylonitrile; amides of acrylic and methacrylic acids such as acrylamide; vinyl esters of carboxylic acids, such as vinyl acetate, vinyl propionate and isopropenyl acetate as well as their halogenated derivatives, such as vinyl chloroacetate; vinyl halides, such as vinyl chloride and vinyl fluoride; vinylidene halides, such as vinylidene chloride; vinyl ethers, such as vinyl methyl ether and vinyl isobutyl ether. It is necessary that the monomers which provide the reactive sites in the copolymer be present in a concentration of from 2 to 25 weight percent of the final copolymer, with the preferred concentration ranging from about 2 to 15 weight percent. With respect to useful proportions of monomers which do not provide reactive sites, use of higher concentrations of monomers which produce soft polymers, such as 2-ethylhexyl acrylate, will result in soft copolymers while the use of higher concentrations of monomers which produce hard polymers, such as vinyl acetate, will result in the production of hard copolymers. It has been found desirable to employ copolymers containing at least about 50%, by weight, of moieties derived from the alkyl esters of acrylic and methacrylic acids in order that the resultant adhesives display superior pressure sensitive properties.

Typical copolymers useful herein are well known and are readily prepared by polymerization procedures well known in the art. In one such procedure, for example, the selected copolymer may be prepared by heating a mixture containing the desired portions of the desired comonomers in any organic solvent which is commonly used in dissolving polymers, e.g. toluene, cyclohexane, methylene chloride, or ethyl acetate, as well as mixtures thereof, in the presence of a free radical initiator such as benzoyl peroxide or azobisisobutyronitrile. The heating is continued for about 1 to 2 hours at the reflux temperature of the solvent system. Thereafter, additional solvent is added to the mixture in order that the concentration of resin solids of the copolymer lacquer is maintained within the desired range of about 25 to 55%, by weight. The polymerization procedure is completed by heating the reaction mixture at its reflux temperature for an additional period of about 5 to 8 hours. Polymerization is complete at this point and the product is then cooled to room temperature. The intrinsic viscosity of these copolymers as measured in acetone at 30° C. preferably exceeds 0.25.

As will be recognized by those skilled in the polymer art, the copolymers resulting from a free radical initiated polymerization procedure of the type here described are to be characterized as "random" copolymers wherein the moieties derived from the respective monomers are randomly distributed throughout the polymer chain. Such random polymers are to be contrasted with the configuration of the so-called block or graft copolymers wherein the moieties derived from the various monomers are in a regular or sequential distribution throughout the polymer molecule. The required tackifying resins suitable for use in the pressure sensitive adhesives of this invention must contain reactive sites, i.e. they must be capable of reacting with the coupling agent. Suitable tackifiers include hydrogenated rosin, polymerized rosin, rosin salts, and various derivatives of rosin. Illustrative examples of specific tackifiers include: hydrogenated methyl ester of rosin, stabilized ester rosin, glycerol ester of rosin, pentaerythritol ester of rosin, pentaerythritol ester of polymerized rosin, pentaerythritol ester of hydrogenated rosin, pentaerythritol ester of dimeric rosin acids, glycerol ester of stabilized rosin acids, ethylene glycolester of polymerized rosin, glycerol ester of polymerized rosin, triethylene glycol ester of hydrogenated rosin, glycerol ester of hydrogenated rosin and stabilized rosin. Suitable tackifiers are characterized by an acid number of at least 3 indicating the presence of reactive sites therein. Tackifier blends containing mixtures of a number of individual tackifiers are available commercially or they can be blended by the practitioner. It is to be noted that suitable tackifier blends can be prepared utilizing two or more tackifiers having reactive sites as well as by utilizing rosin and rosin derivatives with tackifiers having no reactive sites and an acid number of 0 as, for example, phenolic and hydrocarbon resins, polyvinyl methyl ether, polyvinyl ethyl ether, polystyrene and polyterpene.

The coupling agents useful in preparing the pressure sensitive adhesives of this invention are polyvalent metallic salts. The coupling agents are employed in order to react with the reactive sites of the polymer to effectively produce a harder polymer possessing high internal strength. In addition, however, the coupling agent reacts with the reactive sites of the tacifying resin so as to couple the resin into the copolymer network, thereby enhancing the tackiness of the hard polymer. We have found that any polyvalent metallic salt is useful herein but that the preferred salts are selected from the group consisting of aluminum, chromium, iron, zinc, calcium, and magnesium salts. Ordinarily, use of trivalent metallic salts in compositions containing a highly reactive copolymer (i.e. those polymers contaianing a high proportion of reactive sites) is undesirable because the high reactivity of such systems often will lead to gelling of the adhesive lacquers. It is preferable that divalent metallic salts be employed in our compositions in conjunction with these highly reactive copolymers. Use of trivalent metallic salts is preferred with the less reactive copolymers. The preferred anion is nitrate. Chromium and iron salts usually produce a darkening of the final lacquer and are undesirable for this reason for use in applications involving clear substrates. Sulfate salt tend to be insoluble and often form undesirable precipitates in the lacquer.

The actual preparation of our novel adhesive products may be accomplished by merely combining the selected copolymer, tackifier, and coupling agent (which is dissolved in a small quantity of water) together with a water miscible organic solvent as well as an inert organic solvent, if desired, and any optional ingredients whose presence may be desired. The copolymer is used, conveniently, in the form of the organic solvent solution employed in its preparation. Thereafter, the resulting mixture should then be thoroughly agitated so as to achieve a uniform blend, although no heating or other special treatment is required for this operation.

In preparing our novel adhesive products it is necessary to include at least a small portion, no less than about 5% by weight, of the final composition, of a water miscible organic solvent. Illustrative of such water miscible organic solvents which may be employed in the novel adhesive products of this invention are methanol, ethanol, n-propanol, isopropanol, acetone, methyl ethyl ketone, diacetone alcohol, 1,4-dioxane, dimethylformamide, and glycol ethers, as well as any mixtures thereof. A particular requirement of these solvents is that they be miscible with, or capable of dissolving, at least 10%, by weight, of water.

With regard to proportions, it is necessary that the copolymer used herein contain from about 2 to 25%, by weight, of moieties derived from at least one of the applicable monomers possessing reactive sites described hereinabove. Furthermore, the copolymer solids should comprise from about 35 to 60%, by weight, of the total resin solids (i.e. the combined weight of the copolymer and the tackifying resin) while the tackifying resin should comprise from about 65 to 40%, by weight, of the total resin solids. Ordinarily, the concentration of resin solids of a typical adhesive product of this invention will range from about 30 to 65%, by weight, with the preferred concentration ranging from about 40 to 55%, by weight. The concentration of the coupling agent may vary from about 0.3 to 5.0%, based on the weight of copolymer solids.

It is to be noted that a particularly desirable feature of our invention is in the high levels or concentrations of tackifying resins which may be incorporated into our adhesive systems thereby yielding superior 180° peel values without a significant loss of cohesive strength or hold values. Heretofore, tackifying resin levels of pressure sensitive adhesives have generally been restricted to maximum concentrations of about 75 parts of tackifier per 100 parts of copolymer resin solids. Concentrations of about 50 parts of tacifier per 100 parts of copolymer resin solids are commonly employed in prior art adhesives. The use of tackifying resins at the higher levels specified herein results in a rubbery product having a combination of superior peel and hold values.

Where desired, various types of optional ingredients may also be included in the novel products of this invention. Thus, optionally, one may include plasticizers, as, for example, dioctyl phthalate; fillers and pigments, as, for example, talc, titanium dioxide, and calcium carbonate; ultraviolet stabilizers; antioxidants; etc. Small quantities of common organic solvents such, for example, as toluene, ethyl acetate, etc., may also be added, if desired, in order to adjust the final viscosity of these adhesive lacquers as required for their use with particular coating means.

In using the lacquers of our pressure sensitive adhesives, they may be applied to substrates by means of any coating technique whose use is desired by the practitioner. Thus, the adhesive lacquers may be sprayed onto a substrate or they may be applied by the use of any mechanical coating process, such as air knife, trailing blade, reverse roll, or gravure coating techniques. The coating weights at which these lacquers are applied will, of course, vary according to the specific end-use application. Generally, however, these coatings will range from 0.25 to 3.0 mils when dry. Higher coating weights are normally used where gap filling properties are desired.

Our adhesive copolymer lacquers may be coated onto a virtually unlimited variety of substrates, including paper, cloth, paperboard, metal sheets and foils, fiber glass, foamed plastics, rubber, cellophane, wood and plastic films and sheets, such as those derived from polyethylene terephthalate, polystyrene, rubber hydrochloride, polyethylene, polypropylene, polyvinyl chloride and polyvinylidene chloride. Moreover, these novel adhesive products may be used for the bonding and lamination of any of the above listed substrates.

Drying of our adhesive compositions may be effected by forced air or simple air drying, although a particular advantage of our system is that no heat cure cycle is required.

In order to demonstrate the extraordinary characteristics of tack, peel adhesion, and cohesive strength of the adhesives of this invention, selected tests, as described hereinbelow, may be employed.

180° "Hold" Test.—This test measures a combination of interfacial adhesive and cohesive properties, although it is ordinarily used to compare cohesive properties. In conducting this test, films of the adhesives being evaluated are applied to a polyethylene terephthalate film backing in a 1 mil dry thickness. The test samples which are approximately 1 inch in width and 5 inches in length, are securely adhered by thumb pressure to a polished chrome-steel bar which is ½ inch in width so that the sample makes a 180° angle with the vertical and the dimensions of the area adhered to, in each instance, being ½ x 1 inches. After a 15 minute wetting out period, a 500 gram weight is secured to the sample and the time required for the film to separate or delaminate from the bar is recorded as the 180° hold time. Since a hold time of 24 hours (or 1,440 minutes) is generally considered by those skilled in the art to be sufficient to classify an adhesive as "superior," as well as being indicative of a substantially extended period of hold, all of the samples tested which exceeded 1,440 minutes were removed from the bar and assigned a value of >1,440 minutes.

180° Peel Adhesion Test.—This standard adhesion test, as described in ASTM D–1000, serves to measure the interfacial adhesive strength of the adhesive compositions of this invention. The test samples are prepared in the manner described in the 180° Hold Test except that the 1 x 5 inch samples are adhered to a stainless steel panel by means of a rubber roller. The test consists of measuring the force necessary to strip or delaminate the adhesive test sample at a 180° angle from a stainless steel panel at a rate of pull of 12 inches per minute. A tensile tester is used to provide the pulling force. Thus, the force necessary to effect delamination is recorded in ounces as the 180° peel force. A 180° peel force value exceeding about 70 ounces is generally considered by those skilled in the art to be sufficient to classify the adhesive as "superior" in this respect.

In the following examples, which utilize the tests described hereinabove and further illustrate the embodiment of our invention, all parts are given by weight unless otherwise noted.

EXAMPLE I

This example illustrates the preparation of the novel pressure sensitive adhesives of this invention.

To 100 parts of a methylene chloride solution of an octyl acrylate:vinyl acetate:acrylic acid (80:20:6) terpolymer containing 40% resin solids, by weight, and having an intrinsic viscosity of 0.55 as measured in acetone at 30° C., was added 33.6 parts of isopropanol (99%), 17.2 parts of toluene (to adjust viscosity), 42.7 parts of a glycerol ester of hydrogenated rosin and 0.43 part of hydrated aluminum nitrate, $Al(NO_3)_3 \cdot 9H_2O$, which was dissolved in a small portion of water. Thereafter the resultant mixture was well stirred and yielded a clear pressure sensitive adhesive lacquer having a yellow cast and approximately 42% resin solids, by weight.

On evaluation of the adhesive by means of the two above described tests, the following results were obtained:

180° "Hold" Test _____ >1,440 minutes.
180° Peel Adhesion Test _____ 76.8 ounces.

The above results clearly indicate the superior adhesive and cohesive properties of a typical pressure sensitive adhesive prepared according to our invention.

EXAMPLE II

The example illustrates the preparation of similar adhesives for comparative purposes which, however, do not contain all of the required ingredients in the specified proportions in accordance with this invention.

Five adhesive lacquer compositions were prepared, essentially as described in Example I, containing the ingredients listed below:

| Composition Number | Parts | | | | |
|---|---|---|---|---|---|
| | 1 | 2 | 3 | 4 | 5 |
| Terpolymer, as described in Example I | 100 | 100 | 100 | 100 | 100 |
| Hydrated aluminum nitrate | | 0.43 | | 0.1 | 0.43 |
| Isopropanol (99%) | 33.6 | 33.6 | 33.6 | 33.6 | 33.6 |
| Toluene [1] | 17.2 | 17.2 | 17.2 | 17.2 | 17.2 |
| Glycerol ester of hydrogenated rosin | | | 42.7 | 25.0 | |
| Polystyrene resin | | | | | 42.7 |

[1] The toluene was included to adjust viscosity.

On evaluation of these compositions by means of the 180° "Hold" Test and the 180° Peel Adhesion Test, the following results were obtained:

| Number | 1 | 2 | 3 | 4 | 5 |
|---|---|---|---|---|---|
| 180° "Hold" Test (minutes) | 43 | >1,440 | 35 | 124 | 1,122 |
| 180° Peel Adhesion Test (ounces) | 50 | 30 | 82 | 81 | 60 |

From the above results it is seen that Composition #1, which contains no coupling agent (metallic salt) and no tackifier, exhibits a very low cohesive strength and only a moderate amount of adhesive strength. Composition #2, which includes a coupling agent, exhibits a superior cohesive strength and a low adhesive strength. Use of a reactive tackifier but no coupling agent, as in Composition #3, yields a product having a low cohesive strength together with a high adhesive value. Composition #4, which contains both a reactive tackifier and a coupling agent but in less than the required concentrations, however, exhibits low cohesive strength and high adhesive strength. Composition #5, which includes a non-reactive tackifier as well as a coupling agent, displays only a moderate amount of cohesive and adhesive strength. Thus, the above data clearly illustrate that none of these compositions achieve the superior cohesive and adhesive strength (hold and peel values) of the composition described in Example I.

EXAMPLE III

This example illustrates the preparation of additional pressure sensitive adhesives typical of the adhesives of this invention.

Five adhesive lacquer compositions were prepared, essentially as described in Example I, containing the ingredients listed below:

| Composition Number | Parts | | | | |
|---|---|---|---|---|---|
| | 1 | 2 | 3 | 4 | 5 |
| Terpolymer, as described in Example I | 100 | 100 | 100 | 100 | 100 |
| Hydrated aluminum nitrate | 0.43 | 0.43 | 0.43 | 0.43 | 0.43 |
| Isopropanol (99%) | 33.6 | 33.6 | 33.6 | 33.6 | 33.6 |
| Toluene [1] | 17.2 | 17.2 | 17.2 | 17.2 | 17.2 |
| Glycerol ester of hydrogenated rosin (acid No. 8) | 20.4 | 20.4 | 16.4 | | 20.4 |
| Triethylene glycol ester of hydrogenated rosin (acid No. 3) | 9.7 | 9.7 | 5.5 | | 9.7 |
| Stabilized rosin (acid No. 158) | 9.7 | 9.7 | | 43.8 | 9.7 |
| Polystyrene resin (acid No. 0) | 4.0 | | | | |
| Polyterpene resin (acid No. 0) | | 4.0 | 21.9 | | |
| Polyvinyl methyl ether (acid No. 0) | | | | | 4.0 |

[1] Toluene was included to adjust viscosity.

On evaluation of the above compositions by means of the 180° "Hold" Test and the 180° Peel Adhesion Test, the following results were obtained:

| Number | 1 | 2 | 3 | 4 | 5 |
|---|---|---|---|---|---|
| 180° "Hold" Test (minutes) | >1,440 | >1,440 | >1,440 | >1,440 | >1,440 |
| 180° Peel Adhesion Test (ounces) | 80.0 | 89.6 | 72.8 | 73.6 | 82.5 |

As indicated by the above, a portion of the reactive tackifying resin may be replaced by non-reactive tackifying resin provided that the tackifier blend possesses an acid No. of 3 or higher.

EXAMPLE IV

This example illustrates the preparation of additional pressure sensitive adhesive compositions of this invention.

Adhesive lacquer compositions were prepared, essentially as described in Example I, containing the ingredients listed below:

Adhesive lacquer compositions were prepared, essentially as described in Example I, containing the ingredients listed below:

| Composition Number | Parts | | | |
|---|---|---|---|---|
| | 1 | 2 | 3 | 4 |
| Terpolymer, as described in Example I | 100 | 100 | 100 | 100 |
| Hydrated aluminum nitrate | 0.43 | 0.50 | 0.13 | 2.0 |
| Isopropanol (99%) | 33.6 | 33.6 | 33.6 | 33.6 |
| Toluene | 17.2 | 17.2 | 17.2 | 17.2 |
| Glycerol ester of hydrogenated rosin | 26.6 | 74.2 | 40.0 | 30.0 |

On evaluation of these compositions by means of the above described tests, the following results were obtained:

| Number | 1 | 2 | 3 | 4 |
|---|---|---|---|---|
| 180° "Hold" Test (minutes) | >1,440 | >1,440 | 360 | >1,440 |
| 180° Peel Adhesion Test (ounces) | 62 | 83 | 76 | 51 |

Thus, the above data clearly demonstrate that the compositions of this invention which contain both the coupling agent and tackifying resin at the extremes of the specified concentration ranges, respectively, still possess either a good or superior rating with respect to their desired pressure sensitive adhesive properties.

Summarizing, it is seen that the addition of metallic salts as coupling agents to pressure sensitive adhesive compositions which contain both a copolymer and a tackifying resin possessing reactive sites, according to the process of this invention, results in an adhesive displaying superior cohesive and adhesive strength.

| Composition Number | Parts | | | | | | |
|---|---|---|---|---|---|---|---|
| | 1 | 2 | 3 | 4 | 5 | 6 | 7 |
| Octyl acrylate:ethyl acrylate:vinyl acetate:maleic anhydride (70:10:20:5) 34% solids [1] | 100 | 100 | | | | | |
| Octyl acrylate:vinyl acetate:acrylic acid (80:20:6) 40% solids | | | 100 | | | | |
| Octyl acrylate:vinyl acetate:acrylic acid (65:35:6) 40% solids | | | | 100 | | | |
| Octyl acrylate:vinyl acetate:acrylic acid (70:30:10) 40% solids | | | | | 100 | | |
| Octyl acrylate:methyl acrylate:acrylic acid (80:20:6) 40% solids | | | | | | 100 | |
| Butyl acrylate:acrylic acid (90:10) 40% solids | | | | | | | 100 |
| Isopropanol (99%) | 9 | 9 | 33.6 | 33.6 | 33.6 | 33.6 | 33.6 |
| Ethyl acetate | 9 | 9 | | | | | |
| Toluene | | | 17.2 | 17.2 | 17.2 | 17.2 | 17.2 |
| Glycerol ester of hydrogenated rosin | 17.1 | 17.1 | 21.4 | 30.0 | 30.0 | 40.0 | 21.4 |
| Triethylene glycol ester of hydrogenated rosin | 8.6 | 8.6 | 10.7 | 15.0 | 15.0 | 20.0 | 10.7 |
| Stabilized rosin | 8.6 | 8.6 | 10.7 | 15.0 | 15.0 | 20.0 | 10.7 |
| Hydrated magnesium nitrate | 0.43 | | | | | | |
| Hydrated zinc nitrate | | 0.50 | | | | | |
| Hydrated chromium nitrate | | | 0.46 | | | | |
| Hydrated aluminum nitrate | | | | 0.54 | 0.54 | 0.67 | 0.54 |

[1] Prepared and hydrolyzed as described in copending application Ser. No. 728,758 and assigned to the assignee of the present application.

On evaluation of the above compositions by means of the 180° "Hold" Test and the 180° Peel Adhesion Test, the following results were obtained:

Variations may be made in proportions, procedures, and materials without departing from the scope of this invention as defined by the following claims.

| Number | 1 | 2 | 3 | 4 | 5 | 6 | 7 |
|---|---|---|---|---|---|---|---|
| 180° "Hold" Test (minutes) | >1,440 | >1,440 | >1,440 | >1,440 | >1,440 | >1,440 | >1,440 |
| 180° Peel Adhesion Test (ounces) | 73.6 | 79.0 | 88.0 | 78.4 | 73.0 | 75.0 | 83.2 |

EXAMPLE V

This example illustrates the preparation of additional pressure sensitive adhesive compositions employing various concentrations of coupling agent and tackifying resin.

We claim:

1. A pressure sensitive adhesive composition comprising an organic solvent solution of:
(A) a copolymer having reactive sites containing (1) from about 2 to 25% of a polymerizable monomer selected from the group consisting of acrylic acid, methacrylic acid, crotonic acid, itaconic acid, N-methylolacrylamide, N - methylolmethacrylamide, fumaric acid, maleic acid, and $C_1$–$C_4$ alkyl half esters of fumaric and maleic acids, and (2) at least one comonomer polymerizable with said monomer (1) selected from the group consisting of the alkyl and hydroxyalkyl esters of acrylic and methacrylic acids containing a maximum of about 12 carbon atoms in the alkyl group of said esters, said copolymer being admixed in said solution with (B) from about 0.3 to 5.0% based on the weight of said copolymer solids, of a water-soluble metallic inorganic salt selected from the group consisting of aluminum, chromium, iron, zinc, calcium and magnesium salts, and (C) from about 40 to 65% of a rosin or modified rosin based tackifying resin, based on the combined weight of the copolymer solids and the tackifying resin, said tackifying resin having an acid number of at least 3; said pressure sensitive adhesive composition containing at least 5% based on the total weight of the final composition, of a water miscible organic solvent.

2. The pressure sensitive adhesive composition of claim 1, wherein an additional polymerizable comonomer is selected from the group consisting of vinyl esters, vinyl ethers, vinyl halides, vinylidene halides, amides of acrylic and methacrylic acids, and nitriles of acrylic and methacrylic acids.

3. The pressure sensitive adhesive composition of claim 1, wherein said copolymer containing reactive sites comprises an octyl acrylate:vinyl acetate:acrylic acid terpolymer.

4. The pressure sensitive adhesive composition of claim 1, wherein the tackifying resin is selected from the group consisting of: hydrogenated methyl ester of rosin, stabilized ester of rosin, glycerol ester of rosin, pentaerythritol ester of rosin, pentaerythritol ester of polymerized rosin, pentaerythritol ester of hydrogenated rosin, pentaerythritol ester of dimeric rosin acids, glycerol ester of stabilized rosin acids, ethylene glycol ester of polymerized rosin, glycerol ester of polymerized rosin, triethylene glycol ester of hydrogenated rosin, glycerol ester of hydrogenated rosin and stabilized rosin.

5. The comopsition of claim 1, in which the copolymer contains at least 50%, by weight, of the alkyl esters of acrylic and methacrylic acids.

References Cited

UNITED STATES PATENTS

| | | | |
|---|---|---|---|
| 2,211,689 | 8/1940 | Dittmar | 260—27 |
| 2,801,189 | 7/1957 | Collier | 117—72 |
| 3,296,169 | 1/1967 | Corey | 260—27 |
| 2,837,491 | 6/1958 | McKay | 260—27 |

DONALD E. CZAJA, Primary Examiner

W. E. PARKER, Assistant Examiner

U.S. Cl. X.R.

117—72